April 8, 1969 V. RANDOUR 3,437,383
REPLACEABLE COMPACTOR WHEELS AND MOUNTING APPARATUS THEREOF
Filed July 7, 1967

INVENTOR.
VICTOR RANDOUR
BY
ATTORNEYS

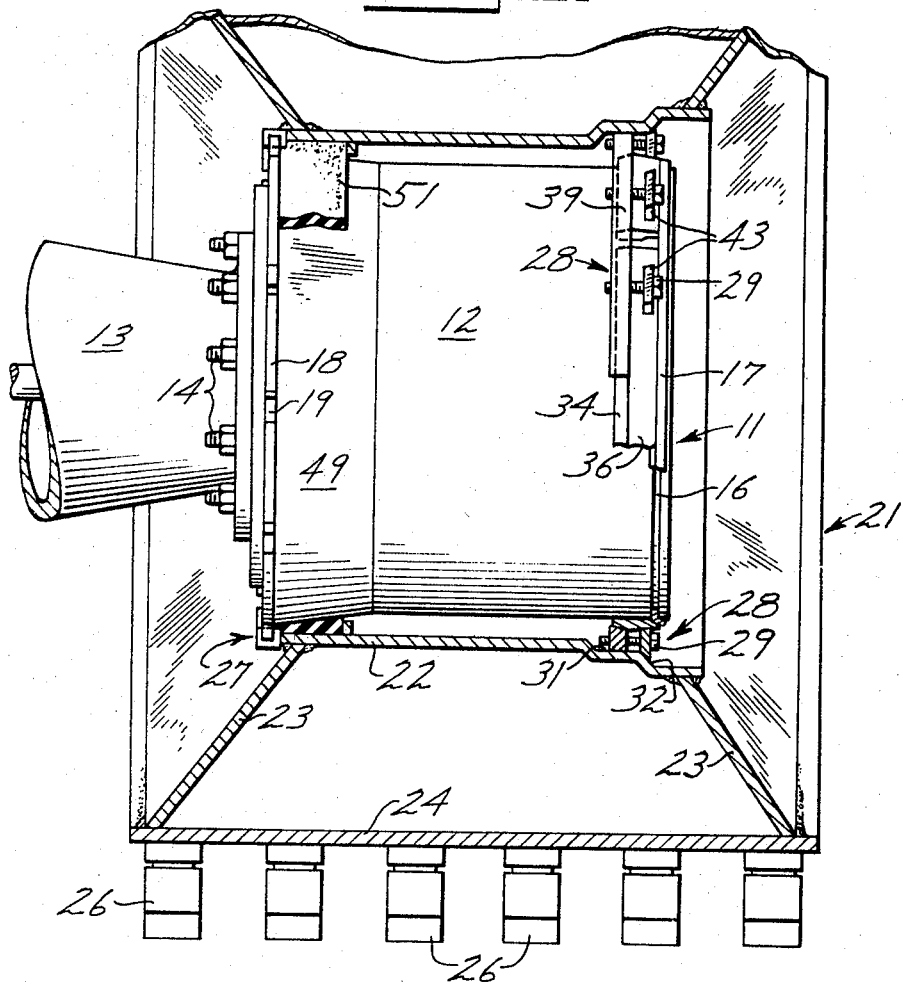
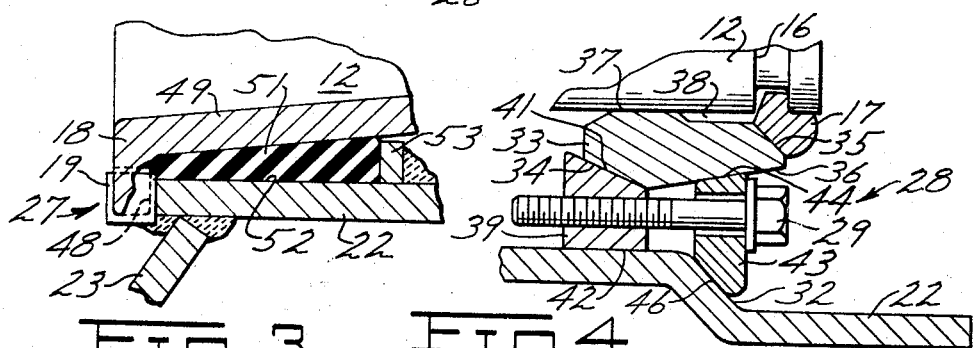

United States Patent Office 3,437,383
Patented Apr. 8, 1969

3,437,383
REPLACEABLE COMPACTOR WHEELS AND MOUNTING APPARATUS THEREOF
Victor Randour, Pekin Ill., assignor to Caterpillar Tractor Co., Peoria, Ill., a corporation of California
Filed July 7, 1967, Ser. No. 651,959
Int. Cl. B60b 23/00
U.S. Cl. 301—22    6 Claims

ABSTRACT OF THE DISCLOSURE

Replaceable compactor wheel and apparatus for mounting same on a standard hub. The replaceable wheel has a rim with an inner edge positively contacting an inner peripheral flange of the hub. An annular member having wedge-receiving surfaces and two wedge rings interact to provide a wedge force between the hub and the replaceable wheel rim to affix the replaceable wheel upon the hub.

BACKGROUND OF THE INVENTION

The present invention is particularly described with relation to replaceable compactor wheels since the problems which are solved by the present invention are particularly prevalent in such wheels. However, as will be made apparent in the following description, the present invention is not limited to replaceable compactor wheels but may be employed wherever it is desirable to have replaceable wheels mounted on a similar hub.

Earth-working vehicles commonly employ interchangeable compactor wheels and rubber-tired wheels which both integrally incorporate final drives therein. It is often necessary to interchange or remove the wheels from such vehicles resulting in exposure of the reduction gearing in the final drive to foreign matter such as dust or dirt. Further, replacement on the integrally incorporated final drive entails complex and difficult servicing procedures; for example, the bearing loads of the final drive must be very carefully adjusted. Both the introduction of foreign material into the final drive and possibly failure to accurately adjust the mounted wheel may result in premature failure of the final drive. Further, the provision of an integral final drive within each replaceable wheel increases the expense of construction as well as the servicing time and expense in interchanging such wheels.

SUMMARY OF THE INVENTION

The present invention eliminates the above problems by providing apparatus for mounting a replaceable wheel on a hub having an annular lock ring groove and a removable lock ring along its axially outer periphery. The mounting apparatus positively retains the replaceable wheel on the hub by exerting a wedge force therebetween.

BRIEF DESCRIPTION OF THE DRAWINGS

FIG. 2 is a central vertical sectional view of the mounted wheel of FIG. 1;
FIGS. 3 and 4 are enlarged fragmentary views in radial section of the inner and outer junctures respectively between the hub and the replaceable wheel of FIG. 2.

DESCRIPTION OF A PREFERRED EMBODIMENT

Figure 1:
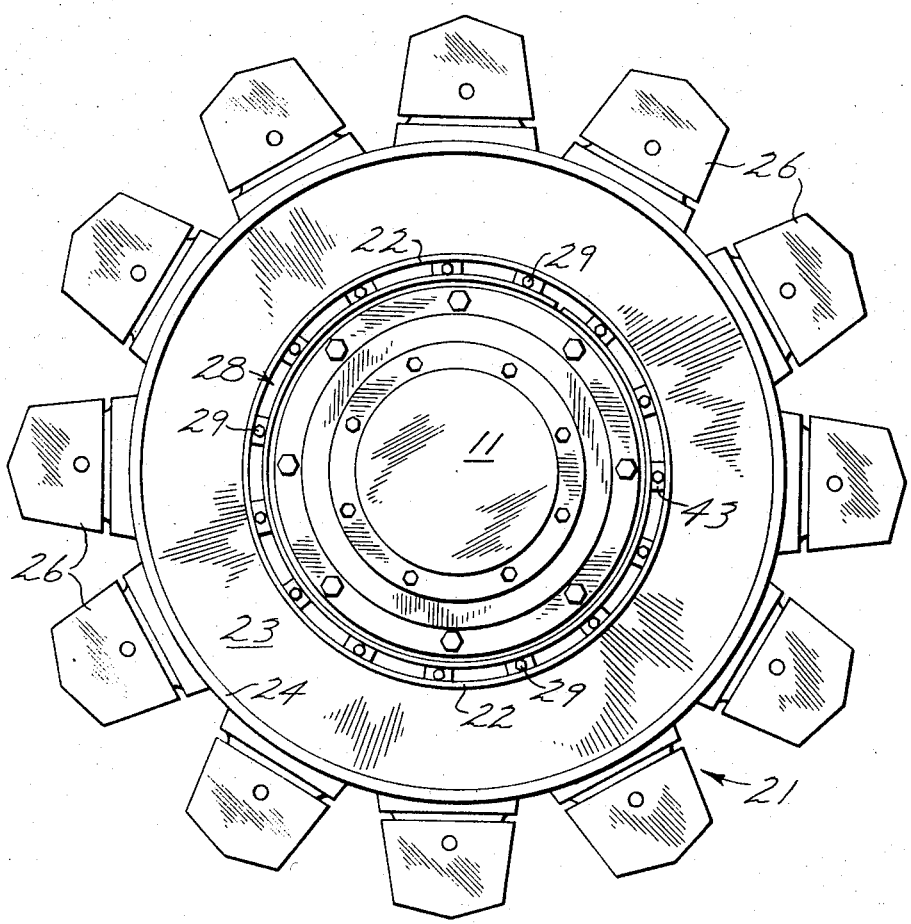
FIG. 1 is a side view in elevation of the replaceable compactor wheel mounted upon a hub.

Referring to FIGS. 1 and 2, a standard hub 11 of a type having an integral final drive (not shown) within its rim 12 is suitable for mounting to the axle 13 of an earth-working vehicle (not shown) by mounting bolts 14 circumferentially spaced upon its inner surface. The hub is further of a type having a lock ring groove 16 about the outer periphery of its rim to receive a split lock ring 17 and having a notched flange 18 forming locking lugs 19 circumferentially spaced thereon about the inner periphery of the hub rim 12. The hub 11 is of a type suitable for receiving a pneumatic tire (not shown) directly in contact with its rim by means of inner and outer tire flanges (not shown) which rest upon the inner flange 18 and the removable lock ring 17 to retain the tire in place upon the wheel assembly.

However, as is shown in FIGS. 1 and 2, a replaceable compactor wheel 21 has an inner hub 22, webbing 23 and an outer cylindrical casing 24 with tamping feet 26 and is disposable upon the wheel assembly. An inner edge 27 of the replaceable wheel hub is suitable for positively contacting the inner flange of the hub to position the replaceable wheel upon the hub.

Mounting apparatus for retaining the replaceable wheel upon the hub comprises a plurality of wedging elements, indicated at 28, which interact to exert a wedging force between the hub, the replaceable wheel and the removable lock ring of the hub. The wedging elements are urged into wedging relation by means of a plurality of adjustable retaining screws 29.

To act in cooperation with the wedging elements 28, the replaceable wheel has an annular recess-forming portion 31 toward its outer edge and a peripheral flange 32 adjacent thereto. Having reference to FIG. 4, the wedging elements include a split annular member 33 having inner and outer inclined wedge-receiving surfaces 34 and 36, respectively, which is disposed about the hub in partially overlapping relation to the removable lock ring 17. The overlapping juncture between the annular member and the lock ring defines a truncated conical surface about the hub axis to permit wedging force to be exerted against the lock ring also. To permit a substantial wedging force to be exerted against the lock ring, a surface 37 of the annular member which is adjacent the hub is recessed to provide an annular space 38 between the hub and the annular member adjacent the locking ring 17. Wedging force exerted upon the lock ring assists in maintaining axial alignment of the wedge elements and replaceable wheel on the hub. A split inner wedge ring 39 is disposed to have its wedge surface 41 adjacent the inner wedge surface 34 of the annular member and to have a surface 42 opposite the wedge surface 41 disposed against the replaceable wheel within the annular recess 31 adjacent its flange 32. A plurality of wedge lugs 43 (see FIGS. 1 and 2 also) are circumferentially spaced about the hub and each has a first wedge surface 44 acting against the outer wedge receiving surface 36 of the annular element and a second wedge surface 46 opposite the first which is disposed against the peripheral flange 32 of the replaceable wheel. One of the adjustable retaining screws 29 passes through each of the drilled lugs 43 to threadably engage the inner wedge ring 39. The splits or discontinuities in the inner wedge ring 39, the lock ring and the annular member 33 are preferably disposed on the mounted wheel in nonaligned relation to increase the strength of the mounting.

To dispose and maintain the replaceable wheel upon the hub, the replaceable wheel and the wedge elements are arranged as indicated in FIGS. 1, 2 and 4. The screws passing through the lugs are engaged with the inner wedge ring to urge the wedge ring and the wedge lugs together to exert a wedging force between the replaceable wheel and the hub by means of the annular member. The wedging force exerted upon the annular member is also transmitted to the lock ring by means of their overlapping juncture and the annular space in the annular member to maintain proper axial positioning of all of the wedge elements. To remove the replaceable wheel, it is only necessary to loosen the screws 29 and remove the wedge elements 28. To insure uniform wedge forces against the surfaces of the hub and the replaceable wheel, the screws preferably act upon the wedge ring parallel to those surfaces.

The inner juncture between the hub and the replaceable wheel is best shown in FIG. 3 where the inner edge 27 of the replaceable wheel is shown as having a plurality of slots 48 circumferentially spaced thereabout to mate with and receive the lugs 19 on the inner flange of the hub. The hub rim 12 flares outwardly as at 49 to meet the flange 18. To insure a tight fit, a flexible, annular member 51 is disposed in the space between flared portion of the rim 12 and the wheel. The flexible, annular member may be of rubber or a similar material and is retained adjacent the edge 27 by means of an annular lip 53 welded to the wheel surface 52.

As the wedging force exerted by the wedging elements is increased by tightening the screws 29, the wheel is urged toward the flange 18 of the hub. This axial force exerted between the wheel and the hub tends to compress the flexible member 51 to insure a positive fit. In addition, as the screws 29 are loosened in order to remove the replaceable compactor wheel, the compressive force stored within the member 51 tends to urge the replaceable wheel away from the inner hub flange to facilitate removal of the replaceable wheel.

What is claimed is:

1. Apparatus for mounting a replaceable wheel on a hub of a type having an outer cylindrical surface and an annular locking groove along its axially outer periphery, a radially extending flange about its axially inner periphery and a removable lock ring disposed in the lock groove, the replaceable wheel mounted upon the hub to positively contact the hub flange, and comprising in combination first and second wedge elements disposed between the wheel and hub, the first element abutting the wheel and having a wedge surface facing radially inwardly and axially outwardly relative to the hub axis, the second element abutting the hub cylindrical surface and the lock ring and having a wedge surface opposing the wedge surface of the first element, and adjustable retaining means associated with the first wedge element to urge the first element axially outwardly against the second element, to urge the second element axially outwardly against the lock ring and to urge the two wedge elements into axially and radially wedging relation between the hub and replaceable wheel.

2. A replaceable wheel and apparatus for mounting same on a standard hub of a type having an annular lock ring groove along its axially outer periphery, a removable lock ring disposable in the lock ring groove and a flange along its axially inner periphery, the combination comprising a replaceable wheel generally mating with the hub, said wheel being flanged along its axially outer periphery and positively seating against the flange of the hub, an annular member disposable about the hub axially inward of and overlapping the removable lock ring, said annular member having an axially inwardly and radially outwardly facing wedge receiving surface and a radially and axially outwardly facing wedge receiving surface both facing the replaceable wheel, an inner wedge ring disposable to have a wedge surface abutting the inwardly facing wedge receiving surface of the annular member and a generally opposite surface against the replaceable wheel, outer wedge means having surfaces disposable against the axially outwardly facing wedge receiving surface of the annular member and the peripheral flange of the replaceable wheel, and a plurality of adjustable retaining means circumferentially spaced about the hub in relation with said inner wedge ring and outer wedge means to urge them together to exert a wedging force between the replaceable wheel and the hub.

3. The replaceable wheel and mounting apparatus of claim 2 wherein the overlap juncture between said annular member and said lock ring defines a generally truncated conical surface relative to the hub axis, said annular member being recessed adjacent said juncture to provide an annular space between said annular member and the hub adjacent the lock ring.

4. The replaceable wheel and mounting apparatus of claim 3 wherein said outer wedge means comprises a plurality of drilled wedge lugs circumferentially spaced about the hub and said retaining means comprises a screw associated with each drilled wedge lug and threadably engaging said inner wedge ring.

5. The replaceable wheel and mounting apparatus of claim 4 wherein said screws are disposed generally parallel to the hub axis to cause uniform wedge forces to be exerted against the replaceable wheel and hub.

6. The replaceable wheel and mounting apparatus of claim 3 where the hub has a gradually increasing diameter adjacent and toward its inner flange, the combination further comprising an axially inner portion of said replaceable wheel forming an annular space about the diametrically increasing portion of the hub, and a compressible annular member disposed in the annular space between the replaceable wheel and the diametrically increasing portion of the hub to be compressed by assembly of said replaceable wheel onto the hub.

References Cited

UNITED STATES PATENTS

| 1,903,189 | 3/1933 | Miller | 301—12 X |
| 1,975,273 | 10/1934 | Higbee | 301—11 |
| 3,129,034 | 4/1964 | Walther | 301—12 |

FOREIGN PATENTS

| 841,697 | 6/1952 | Germany. |

RICHARD J. JOHNSON, Primary Examiner.

U.S. Cl. X.R.

94—50